United States Patent [19]

Kirner

[11] 4,217,470

[45] Aug. 12, 1980

[54] IGNITION DISTRIBUTOR WITH NOISE SUPPRESSION ELECTRODES

[75] Inventor: Kuno Kirner, Gerlingen, Fed. Rep. of Germany

[73] Assignee: Robert Bosch GmbH, Stuttgart, Fed. Rep. of Germany

[21] Appl. No.: 915,655

[22] Filed: Jun. 15, 1978

Related U.S. Application Data

[63] Continuation-in-part of Ser. No. 845,123, Oct. 25, 1977, abandoned.

[30] Foreign Application Priority Data

Jul. 6, 1977 [DE] Fed. Rep. of Germany ....... 2730416

[51] Int. Cl.$^2$ ....................... H01H 19/00; F02P 1/00; C01B 33/06

[52] U.S. Cl. .......................... 200/19 R; 123/146.5 A; 123/633; 200/19 DR; 200/262; 423/344

[58] Field of Search .......... 200/19 R, 19 DC, 19 DR, 200/262, 267, 268, 270; 123/146.5 A, 148 D; 423/344, 400, 405

[56] References Cited

U.S. PATENT DOCUMENTS

| | | | |
|---|---|---|---|
| 2,848,586 | 8/1958 | Wainer et al. | 423/344 X |
| 3,361,886 | 1/1968 | Prickett | 200/19 DR X |
| 3,362,787 | 1/1968 | Matchen | 423/344 |
| 3,726,643 | 4/1973 | Merzhanov et al. | 423/344 X |
| 3,949,721 | 4/1976 | Hori et al. | 200/19 R X |
| 4,007,342 | 2/1977 | Makino et al. | 200/19 R |
| 4,039,787 | 8/1977 | Hori et al. | 200/19 R |
| 4,074,090 | 2/1978 | Hayashi et al. | 200/270 X |
| 4,091,245 | 5/1978 | Komiyama et al. | 200/19 R |
| 4,135,066 | 1/1979 | Yamanaka et al. | 200/19 R |

*Primary Examiner*—James R. Scott
*Attorney, Agent, or Firm*—Frishauf, Holtz, Goodman & Woodward

[57] ABSTRACT

To provide for better distributor radio interference noise suppression and to localize resistance elements used in connection therewith as close to the spark gap of the distributor, the rotor electrode and/or the stationary electrodes in the distributor are made of a resistance material which has a sufficiently high resistance to provide for effective interference suppression; the material may be a high-melting oxynitride, particularly of a metal of the III or IV-B to VI-B groups of the periodic table; or a ceramic substrate, on which a coating is applied, for example of high melting point titanium, zirconium or aluminum oxide which are rendered conductive by being present in less than stoichiometric proportions; or silicon compounds such as chromium-silicon compounds, molybdenum-silicon compounds, with or without a matrix of silicon or ceramic-metal mixture in which the metal is both a binder and a conductive component, particularly $Al_2O_3$-Mo, $Cr_2O_3$-Si, SiC-Cr-Ni and $B_4C_3$-Ni.

8 Claims, 3 Drawing Figures

IGNITION DISTRIBUTOR WITH NOISE SUPPRESSION ELECTRODES

This application is a continuation-in-part application of Ser. No. 845,123 filed Oct. 25, 1977, now abandoned.

Reference to related application incorporated hereby:

U.S. Ser. No. 845,124, abandoned, filed Oct. 25, 1977, NEU et al.

Reference to related prior art:

German Patent DT-PS No. 1,123,866

German Disclosure Document DT-OS No. 24 30 419 DT-OS No. 25 01 247 DT-OS No. 25 03 352.

The above-mentioned German Disclosure Documents correspond to U.S. Pat. Nos. 3949721; 4,007,342 and 4074090, respectively.

BACKGROUND OF THE INVENTION

The present invention relates to a distributor for spark-ignited internal combustion engines, and more particularly to the electrode construction and material, and the method of their manufacture, to provide high-resistance distributor electrode elements to improve the radio interference noise suppression characteristics of the distributor.

The customary distributor construction and system, which is not basically changed, provides for a cylindrical structure in which a plurality of fixed electrodes are located on the circumference of an imaginary cylindrical surface. The electrodes are connected over high-tension spark plug wires to spark plugs. A distributor rotor is located internally of the distributor which has a central distributor contact, rubbing against a carbon pin or carbon brush. The carbon pin or central contact is connected to the secondary of a spark plug coil, and the tip of the rotor is formed with a terminal electrode which passes closely by the fixed electrodes to form a conductive spark connection therewith if current through the ignition coil is suddenly interrupted while the distributor rotor tip is opposite one of the fixed electrodes as it rotates within the distributor.

The spark breakdown within the distributor causes radio interference and other noise in electronic apparatus which may be installed close to the internal combustion engine, typically in an automotive vehicle to which the present invention is especially adapted. It has previously been proposed—see German Pat. No. 1,123,866—to construct a distributor rotor electrode of electrically highly conductive material and placing a noise suppression resistor mechanically as well electrically ahead of the distributor rotor electrode. Suppression of electrical interference radiation, caused by the spark breakdown between the rotor electrode and the respective fixed electrode which is opposite to the rotor electrode at any given instant, is the more effective, the closer the suppression resistor is to the spark gap itself. Placing a separate resistor close to the distributor electrode is difficult and limits to the closeness of location thereof to the spark gap itself arise due to mechanical difficulties. A relatively high arc-over current still results, requiring a high resistance and high current carrying suppression resistor which, in turn, requires a sturdy mechanical construction. Otherwise, the resistor may be overloaded or the noise radiation cannot be effectively suppressed.

SUMMARY OF THE INVENTION

It is an object of the present invention to provide a distributor system, apparatus, and more particularly an electrode construction, and a method to provide such an electrode construction, in which improved radio interference noise suppression characteristics can be obtained, which are simple, effective, and permit manufacture under mass production conditions.

Briefly, at least one of the electrodes, that is, the rotating electrode of the rotor, and/or the fixed electrodes in the distributor are made of a resistance material which has a resistance sufficiently high to provide for interference suppression.

In accordance with a feature of the invention, the material is a ceramic which has high-resistance conductive, or semiconductor conductive characteristics; in accordance with the invention, the electrode is a preferably composite structure made of an essentially insulating ceramic on which the material having a high resistance, e.g., a high melting point metal oxynitride, is applied. The oxynitride which, preferably, is the oxynitride of a metal of the group III or IV-B to VI-B group tansition metals of the periodic table, is applied by chemical vapor deposition, physical vapor deposition, or plasma spraying.

The electrode or electrodes in accordance with the present invention, which are of high-resistance material, thus provide the suppression resistance immediately adjacent the spark gap of the distributor so that the physical placement of the resistance element is an optimum. This permits use of a substantially lower resistance value with equally efficient radio interference noise suppression—in comparison to separate outside resistors—so that the spark plugs themselves will be supplied with higher spark energy if the remainder of the ignition system is unchanged.

It has been found that conductive oxides of metals which are rendered conductive due to their proportion in nonstoichiometric relation, typically less than stoichiometric proportions can be readily formed by using plasma spraying, chemical vapor deposition or physical vapor deposition. Oxynitrides of titanium, zirconium, chromium and tantalum are particularly suitable. Oxynitrides can also be formed by these methods, by adding nitrogen gas to the gas atmosphere which is used. When the material is formed by plasma spraying, the percentage of nitrogen in the atmosphere ranges from 1 to 100%. When using physical vapor deposition, the metal which is being converted to the oxy-nitride is vaporized in a vessel having a partial pressure of oxygen and nitrogen in the order of $10^{-4}$ bar (preferred conditions).

As examples of useful materials, chromium silicides or molybdenum silicides are particularly suitable. Ceramic—metal mixtures can be applied by plasma spraying, in which the metal forms simultaneously the matrix and conductor. Typical combinations are aluminum oxide-molybdenum, chromium silicide-silicon; silicon carbide-chromium-nickel or boron carbide-nickel.

DETAILED DESCRIPTION OF PREFERRED EMBODIMENTS

Figure 3:
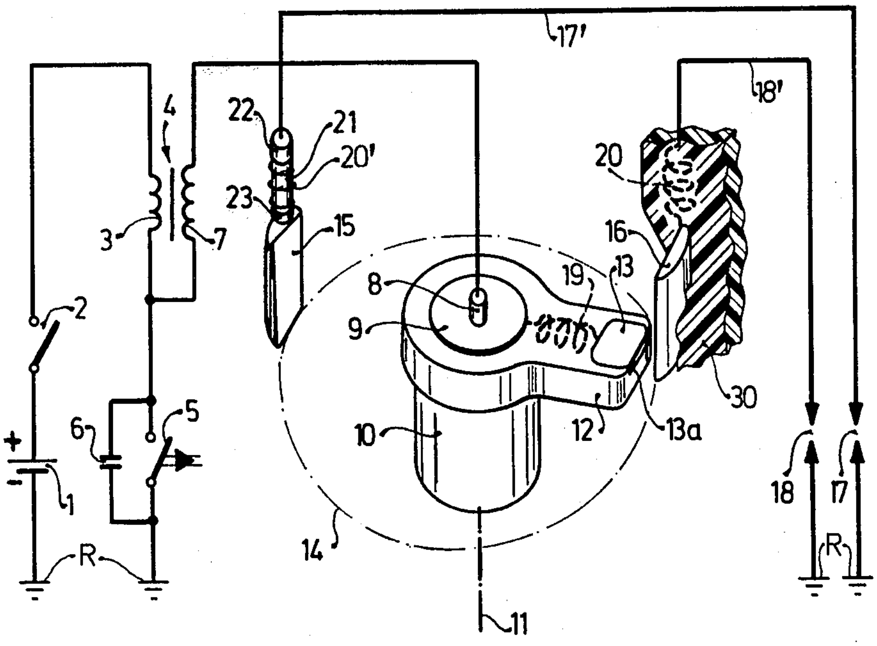
FIG. 3 is a high schematic diagram of a distributor system using high-resistance electrode elements and illustrating another embodiment and feature of the present invention, in which the distributor rotor, and stator components thereof are shown in perspective, and partly perspective, broken-away representation.

Referrig first to the general system, FIG. 3: The ignition system is shown in highly simplified form applied to an automotive-type internal combustion engine. A source 1 of direct current, typically the vehicle battery, has its negative terminal connected to ground, chassis or reference potential R, and its positive terminal to a main ON/OFF switch 2 which, typically, is the ignition switch of the vehicle. The positive connection then leads to the primary 3 of an ignition coil 4, and then to a distributor breaker switch 5, which is bridged by a capacitor 6. The distributor switch 5 is shown as a simple mechanical ON/OFF switch, although it may be any one of different types of electronic ignition systems, and the switch 5 may be an electronic switch. The capacitor 6 functions as a suppression capacitor. The switch-side of the primary 3 is connected to one terminal of the secondary 7 of the ignition coil 4, the other terminal of which is connected to a carbon tip 8 which forms a slip contact with the center terminal 9 of distributor rotor 10. Spring pressure between carbon tip 8 and center terminal 9 provides for good electrical contact. The terminal 8, typically, is a spring pressed carbon button or pin. The rotor 10 on which the terminal 9 is located is made of insulating material and rotates in synchronism with rotation of the engine as schematically indicated by connection to a shaft 11. The rotor 10 has a radially projecting finger 12, the free end of which has a tip electrode 13 located therein. The rotor 10, of plastic or similar material, moves the tip terminal 13 about the circumference of an imaginary cylinder, indicated schematically by the circle 14. A plurality of fixed electrodes, of which only two electrodes 15, 16 are shown, are located about the circumference of the cylinder. The fixed electrodes 15, 16 are connected by ignition wires 17', 18' to respective spark plugs 17, 18. As the rotor 10 rotates about predetermined arcs in its circle of rotation, it will face respective fixed electrodes 15, 16.

In accordance with the present invention, the distributor tip electrode 13, and/or each of the fixed electrodes 15, 16 are made of a high-resistance material, preferably a ceramic having semiconductor conduction characteristics, or having inherently high electrical resistance, but being sufficiently conductive for the ignition currents. The electrodes 13, 15, 16 forming an electrode means thus, themselves and inherently, form the interference noise suppression resistor.

In the example illustrated, the distributor electrode 13, as well as the fixed electrodes 15, 16 are made of this high-resistance, or semiconductor conductive characteristics material. If it is not needed or desired to make the fixed electrodes 15, 16 on the one hand, or the distributor rotor tip electrodes 13, respectively, of the high-resistance material, then conventional terminal material can be used, for example brass. The distributor electrode 13 is electrically connected with the center terminal 9 which is in electrically conductive connection with the connection button 8. The electrical connection between the electrode tip 13 and the center terminal 9 is formed as a choke or suppression coil 19. The connection between the fixed electrodes and the terminals which lead to the ignition wires 17', 18' likewise is over a coil 20 which, preferably, is molded into the insulating material 30 of which the distributor cap is formed. The distributor cap 30 itself can be of conventional material. A coil 20' is interposed between electrode 15 and the connection to the ignition wire 17'. The wires of the coils 19, 20, 20' preferably are made of low-resistance material. Coil 20 and coil 19 are shown molded into the respective elements to which the electrodes 13, 16 are attached—the rotor 10 and the distributor cap 30. In manufacture, the rotor 10 and the cap 30 may be injection molded plastic elements in which the electrodes and the connecting coils, together with such terminal contact elements as may be needed, are molded in one operation to form the single unitary element. In a preferred form, at least the coils of the fixed electrodes 20, 20' are formed with a central core 21. Core 21 (not shown in connection with coil 20 for simplicity of illustration) is made of a material which has suitable dielectric and magnetic characteristics. A typical material is ferrite. Electrically conductive connection caps 22, 23 are located at the end terminals of the core 21, for electrical connection to the conventional push terminal for connection to cable 17', and for connection to the electrode 15, respectively. The fixed electrode 15 and, separately, the core 21—resistance wire coil 20' combination, may be separate elements assembled in modular principle and adhered in the cap of the distributor, rather than being injection molded therein. When made as modular elements, individual replacement of defective parts is readily possible.

Operation: Upon closing of ignition switch 2, and with breaker switch 5 closed, current will flow through the primary 3 storing energy in ignition coil 4. At the ignition instant, determined by rotation of the distributor shaft, for example, or by an electronic ignition system, switch 5 is opened to break current through primary winding 3 of the ignition coil 4, which results in a high-voltage pulse in the secondary. In the position shown in FIG. 3, a spark will jump over from terminal 13 of the rotor 10 to the fixed terminal 16 in the distributor cap, the current then flowing to spark plug 18 over spark plug wire 18', to provide a spark at the spark plug 18.

In accordance with the invention, the distributor electrode 13 and/or the fixed electrode 16 being of high-resistance material immediately adjacent the spark gap between the electrodes 13, 16 substantially decreases the discharge current—in comparison to conventional ignition distributors—at the spark gap itself and thus effectively decreases or completely eliminates interference radiation. The suppression or choke coils 19, 20, 20' additionally improve interference suppression by further suppressing noise radiation which interferes with radio and television transmission.

For use in a 12 V ignition system, the following values are suitable:

Resistance of tip terminal electrode 13: 100-5000 ohms
resistance of fixed electrode 15, 16: 100-5000 ohms
resistance of coils 19, 20, 20': Lower than 1000 ohms
inductance of coil 19, 20, 20' with core 21: 30-200μ Henry
diameter of coil 19, 20 20': 3-6 mm number of turns: 100-400
material of core 21: ferrite inductance of coils 19, 20, 20' without core 21: 30–200μ Henry In accordance with a further feature of the present invention, the electrodes 13, 15, 16 may be a composite element in which an unconventional material which is difficult to work is applied to a substrate, typically a ceramic which is nonconductive. This is in contrast to the conventional metallic, highly conductive terminal elements.

It has previously been proposed—see German Disclosure Documents DT-OS Nos. 24 30 419; 25 01 247; and 25 03 352—to make suppression resistors by using cupprous oxide, aluminum oxide, or INVAR; it has also been proposed, as described in these disclosure documents, to make resistors based on solid silicon, or on silicon coatings by the ion plating process. In accordance with the present invention, materials are used which can additionally meet the requirements of repeated spark discharge in ambient atmosphere and while being mechanically stressed, for example due to high-speed rotation of the rotor pin of the distributor in which the material is located.

Figure 1:
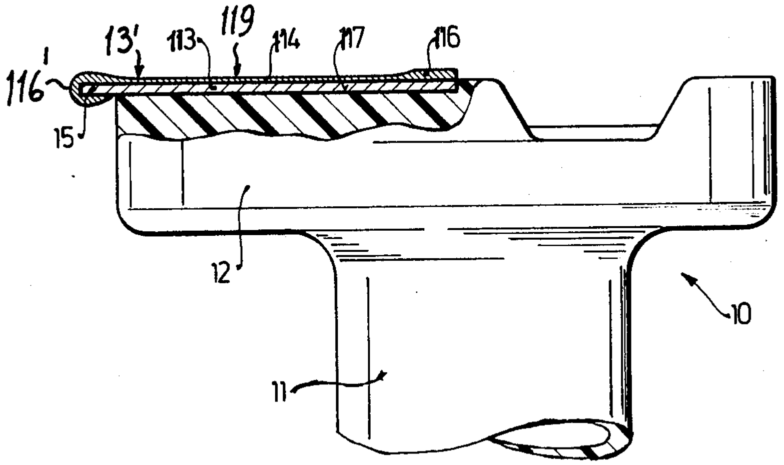
FIG. 1 in the original drawings to about 1:1 scale, is a side view, partly in section, of a distributor rotor.
Figure 2:
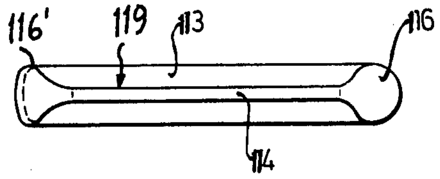
FIG. 2 is a top view of the rotor electrode before incorporation into the distributor rotor, and to the same scale as FIG. 1.

Referring now to FIGS. 1 and 2: The distributor rotor 10 has an extension 111 which is secured to the shaft 11 (not shown in FIG. 1) in conventional manner. The finger or arm 12 which projects radially and, preferably, tapers towards the tip thereof so that the tip end is narrower than the shaft end, has a contact plate 13' located thereon which is a composite element. Contact plate 13' is an essentially rectangular elongated strip made of a ceramic, for example aluminum oxide, and injection-molded in the distributor rotor body 10. The outer tip of the electrode 13 extends beyond the radial end of the rotor 10 by a few millimeters. The ceramic body 113 has a distributor electrode 119 applied thereto which simultaneously provides for conduction of electrical energy to the tip, for arc-over to the fixed electrode and for sufficient resistance to function as a noise suppression resistor. The electrically conductive layer 119 extends over and around the tip end 115 of the ceramic plate 113, to form a thickened portion a few tenths of a millimeter in thickness, so that it will project forwardly of the ceramic by several tenths of a millimeter. The tip end of the layer 119 loops around the ceramic plate 113 in hook-like fashion as illustrated in FIG. 1, so that the end surface as well as the top and bottom surfaces of the ceramic plate 113 are covered by the coating of the electrode 119.

FIG. 2 illustrates the shape of the electrode 119. Beyond the end portion thereof, the electrode is formed of reduced width to provide an elongated conductive strip 114 which extends to an enlarged central portion 116, which forms the center contact for engagement with the connection pin or button 8 (FIG. 3). The strip 114 as well as the center portion 116 are applied to the ceramic base 113—which is of essentially uniform width—in the same manner as the end portion of the electrode 119, and is made of the same material, that is, of non-conventional materials which are difficult to be machined or worked after once having been applied to a substrate. The ceramic substrate 113 is of approximately 1 mm thickness, but it can vary between 0.5 and 1.5 mm; the dimension is not critical.

Preferably, the ceramic body 113 first has the electrode 119, including strip 114 and center contact portion 116, applied thereto to form a subassembly. The rotor 10 is formed with a groove or notch 117 into which the subassembly is inserted for attachment therein. It can be molded in, secured by adhesive or otherwise attached in any suitable manner.

Suitable materials for use in the system and device of the present invention are:

For the ceramic body 113: aluminum oxide, magnesium spinel, or stabilized zirconium oxide.

The non-conventional materials, which are difficult to work or machine and forming the combination of electrode-and-interference noise suppression resistance, that is, electrode 119, strip 114 and center contact 116: oxy-nitrides having a melting point, particularly of metals of the III or IVa to VIa group of the periodic table; metal oxides which are conductive by being present in less than stoichiometric proportion, such as oxides of titanium, zirconium, aluminum; silicides, particularly chromium disilicide ($CrSi_2$), and molybdenum disilicide ($MoSi_2$), and ceramic-metal mixtures, in which the metal forms simultaneously the conductive element as well as the matrix. Particularly suitable are mixtures of aluminum oxide—molybdenum; chromium disilicide—silicon; silicon carbide—chromium nickel; boron carbide—nickel; nickel oxide—tungsten; aluminum oxide—titanium oxide—nickel.

To improve the characteristics regarding resistance and effects of the spark between the fixed and rotor electrode, particularly pitting, and especially in connection with chromium silicide, it is suitable to heat the electrode to incandescent temperature in an atmosphere rich in oxygen to above 1000° C. At these temperatures sintering and therefore densification and bond improvement between substrate and layer occurs. The silicides are partially converted by this heating to the oxides and they obtain a better stability in their properties, particularly in the electrical resistance and burn-off characteristics. This is entirely possible with a ceramic base material—in contrast to the use of metallic contacts embedded in plastics.

The electrodes, the strip 114 and the center contact 116, can be applied best by plasma spraying, chemical vapor deposition or physical vapor deposition methods are possible, too, if sufficient coating thickness is obtained.

The resistance of the electrode 119 can be varied by changing the width of the connecting strip 114 between the electrode tip and the center portion 116. The width of the strip 114 may vary between about 0.5 to 1.5 mm, the actual width 1 mm selected is determined by the eventual resistance which the electrode is to have.

The composite electrode has been described specifically in connection with the center electrode 13, connected to the rotor. Similar materials may also be used for the fixed electrode, in which case the entire electrode may be applied to a ceramic plate and have a shape similar to the shape shown in FIG. 1. The electrodes 15, 16 could have a shape similar to that illustrated in FIG. 2, and placed vertically, with the tip end of the fixed electrode being positioned opposite the tip end 116' of the rotor electrode, and a connecting strip, similar to strip 114 extending towards the fixed contact which is then in turn connected to the conventional terminal sleeve for connection to the spark plug cable 18'. If desired, an additional inductance—resistance coil or winding 19, with or without a core 21, may be used.

Typical, approximate dimensions for an ignition system for a four-cylinder internal combustion engine, with a battery voltage of about 12 V are:

Width of strip 114: 0.5–1.5 mm width of tip end 116' of electrode 119: about 10 mm width of the center 116 of electrode 119: about 10 mm
thickness of electrode at tip 116': about 1–1.5 mm
thickness of center portion 116 of electrode 119: about 1–1.5 mm The oxy-nitrides of metals of the group III or IV-B to VI-B periodic table transition metals useful as the resistance material of the present invention include $Ti(O,N)_2$, $Zr(O,N)_2$, $Cr_2(O,N)_3$, and $Ta_2(O,N)_5$. Such materials may be prepared by plasma spraying or by CVD processes and PVD processes in reactive atmospheres as discussed hereinafter. This is illustrated by the preparation of titanium oxy-nitride, $Ti(O,N)_2$ coatings. $TiO_2$ powders having a grain size of −325 mesh are sprayed using an argon-nitrogen plasma gas through a plasma burner having about 30 KW power. Similarly, an oxy-nitride of titanium was prepared by spraying titanium powder using a nitrogen-rich plasma. The oxy-nitrides of zirconium, chromium and tantalum were obtained using similar methods by spraying the respective oxides or metals.

Plasma spraying may be used to produce coatings of various thicknesses, without a thickness maximum being imposed by the process. The present status of CVD processes and PVD processes limits the thicknesses which may be obtained and it may not be possible to obtain material of the desired thickness for the purposes of the present invention using such processes. However, progress in the technology of these processes may provide increased thicknesses.

The conductive oxides of titanium, zirconium and aluminum which have high resistance contain less than the stoichiometric amount of oxygen as illustrated by the composition of a high resistance titanium oxide which has the formula $TiO_{2-x}$ wherein x is from about 0.01 to 0.1. Such less than stoichiometric oxides can be prepared by a number of processes including plasma spraying, and high temperature and vacuum deposition processes. When using high temperature processes such as plasma spraying, the bond of the oxygen to the metal is weakened and the deposited oxide is deficient in oxygen, i.e., an under stoichiometric compound. By heating in air or oxygen, the vacancies may again be filled with oxygen. The under stoichiometric oxides (deficient in oxygen compared with the stoichiometric) are characterized by discoloration. For example $TiO_2$ is white; the less than stoichiometric compound is black. The less than stoichiometric oxides of titanium, zirconium and aluminum have been produced using an argon plasma of from 20 to 40 KW.

The silicides which are useful in the present invention can be prepared as disclosed in the book Hartstoffe by Kieffer and Benesovsky, pages 455–457, and are commercially available. Substrates which when coated will be useful as electrode lugs or fingers have been coated with molybdenum disilicide and chromium disilicide, respectively, using a plasma burner (torch) having a power of 20 to 40 KW to produce coatings up to 1.5 mm thick. The resistance of such coatings was in the range of 2–10 Kilo-ohms.

The metal-ceramic materials having high resistance which are useful in the present invention specified herein wherein the metal (which may be silicon) comprises the matrix, contain between about 5% and 95% by weight and preferably between 10% and 25% of the metal, with the remainder comprising the ceramic. Such materials can be prepared as disclosed by plasma spraying techniques using powder mixtures of ceramic powder and metal powder. Mixtures have been prepared using a plasma burner (gun) of 40 KW power input. The powders were of −400 mesh grain size. The power settings on the plasma apparatus were 400 to 600 amps and 30–70 volts for workpieces spaced a distance of 8 cm. The plasma was a mixture of argon and nitrogen. Air cooling was used. When using a dispenser which feeds two powders to the torch, any composition between 5% and 95% ceramic (oxide) and 95% and 5% metal can be produced. Under these conditions and using this apparatus, the following mixtures were produced: alumina and molybdenum; nickel oxide and tungsten; aluminatitania and nickel; chromium disilicide and silicon; molybdenum disilicide and silicon; silicon carbide and nickel—chromium; and boron carbide and nickel.

The preferred high resistance materials for use in the present invention are molybdenum disilicide and chromium disilicide respectively in silicon, particularly a mixture of 90% chromium disilicide and 10% silicon.

The thick film methods of forming the high resistance materials as a coating on a ceramic substrate useful as the high resistance electrode in the present invention have been produced as discussed hereinbefore, for example by the plasma spray method which is well known and disclosed for example in U.S. Pat. No. 2,806,124 and the G. M. Giannini article entitled "The Plasma Jet," Scientific American, August 1957; the chemical vapor deposition (CVD) method disclosed by B. W. Gonser, Vapor Plating, John Wiley & Sons, 1955; and the physical vapor deposition (PVD) method disclosed in the Maissel, L.L., et al, Handbook of Thin Film Technology, McGraw-Hill Book Company.

It is presently preferred to prepare an electrode such as that disclosed in FIG. 2 by the plasma spray method using a plasma torch of conventional design constructed by Applicant's Assignee consisting of a tungsten cathode and copper anode fixed in an electrically insulating housing. The plasma gas used is generally an argon-hydrogen mixture with current settings between about 400 and 600 amps at voltages of 40–60 volts.

Various changes and modifications may be made and features described in connection with any one of the embodiments may be used with any one of the others, within the scope of the inventive concept.

I claim:

1. Ignition distributor for an internal combustion engine having a fixed electrode means including a plurality of fixed electrodes (15, 16) located on the circumference of an imaginary cylindrical surface;

connection means (20) connecting each of said electrodes to a spark plug wire (17', 18') for connection to a respective spark plug (17, 18);

a distributor rotor (10);

a central distributor contact (9, 116) on the rotor;

means (8) connecting said contact to the secondary (7) of a spark coil (4);

and a terminal electrode means (13, 13') on the rotor (10) to provide a connecting spark gap in conjunction with a respective fixed electrode as the electrode means on the rotor rotates past the fixed electrodes, at least one of the electrode means (13, 13', 15, 16) including in its electrical conduction path a resistance material having a resistance sufficiently high to form a radio interference noise suppression resistance, wherein, in accordance with the invention, the resistance material comprises at least one high melting point oxy-nitride of a metal selected from the group III, or IV-B to VI-B transition metals of the periodic table.

2. Distributor according to claim 1, wherein said material is at least one oxy-nitride of a metal selected from the group consisting of titanium, zirconium, chromium, and tantalum.

3. Ignition distributor for an internal combustion engine having a fixed electrode means including a plurality of fixed electrodes (15, 16) located on the circumference of an imaginary cylindrical surface;

connection means (20) connecting each of said electrodes to a spark plug wire (17', 18') for connection to a respective spark plug (17, 18);

a distributor rotor (10);

a central distributor contact (9, 116) on the rotor;

means (8) connecting said contact to the secondary (7) of a spark coil (4);

and a terminal electrode means (13, 13') on the rotor (10) to provide a connecting spark gap in conjunction with a respective fixed electrode as the electrode means on the rotor rotates past the fixed electrodes, at least one of the electrode means (13, 13', 15, 16) including in its electrical conduction path a resistance material having a resistance sufficiently high to form a radio interference noise suppression resistance, wherein, in accordance with the invention, said at least one electrode means comprises a composite structure having a substrate carrier (113) of insulating material and a high-resistance, or semiconducting characteristic electrode layer (119;116, 114, 116) located on said substrate, and said layer comprises a metal silicide.

4. Distributor according to claim 3, wherein said silicide comprises at least one of: chromium disilicide; dimolybdenum silicide.

5. Ignition distributor for an internal combustion engine having a fixed electrode means including a plurality of fixed electrodes (15, 16) located on the circumference of an imaginary cylindrical surface;

connection means (20) connecting each of said electrodes to a spark plug wire (17', 18') for connection to a respective spark plug (17, 18);

a distributor rotor (10);

a central distributor contact (9, 116) on the rotor;

means (8) connecting said contact to the secondary (7) of a spark coil (4);

and a terminal electrode means (13, 13') on the rotor (10) to provide a connecting spark gap in conjunction with a respective fixed electrode as the electrode means on the rotor rotates past the fixed electrodes, at least one of the electrode means (13, 13', 15, 16) including in its electrical conduction path a resistance material having a resistance sufficiently high to form a radio interference noise suppression resistance, wherein, in accordance with the invention, said at least one electrode means comprises, as said resistance material, a ceramic—metal mixture in which the metal forms, simultaneously, the binder, and the electrical conductive component of said electrode means, and said ceramic-metal mixture comprises at least one of: aluminum oxide—molybdenum; nickel oxide—tungsten; aluminum oxide titanium oxide—nickel; chromium silicate—silicon; silicon carbide—chromium nickel; boron carbide—nickel.

6. Distributor according to claim 5 wherein said at least one electrode is a molybdenum disilicide-silicon mixture, or a chromium disilicide-silicon mixture.

7. Distributor according to claim 6 wherein the silicon matrix component of said mixture is between about 105 and 25% by weight.

8. Distributor according to claim 7 wherein the silicon component of said mixture is about 10% by weight.

* * * * *

UNITED STATES PATENT AND TRADEMARK OFFICE
CERTIFICATE OF CORRECTION

PATENT NO. : 4,217,470

DATED : August 12, 1980

INVENTOR(S) : KUNO KIRNER

It is certified that error appears in the above-identified patent and that said Letters Patent are hereby corrected as shown below:

Claim 7, last line of the claim (column 10, line 39), "105" should be --10%--.

Signed and Sealed this

*Twenty-fifth* Day of *November 1980*

[SEAL]

*Attest:*

SIDNEY A. DIAMOND

*Attesting Officer* *Commissioner of Patents and Trademarks*